F. E. GOODHUE.
DRAW BAR ATTACHMENT.
APPLICATION FILED MAR. 17, 1913.
1,068,334.
Patented July 22, 1913.
2 SHEETS—SHEET 1.
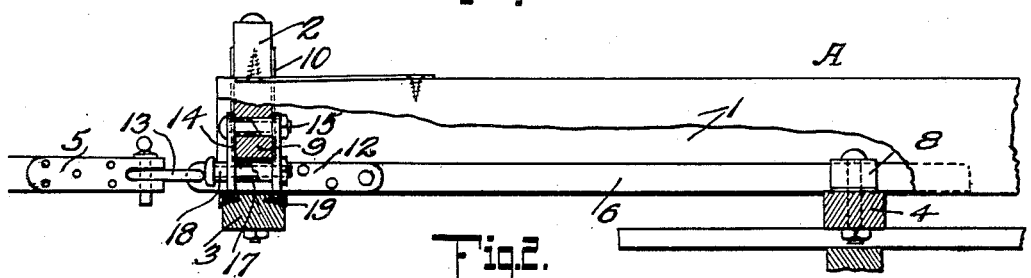
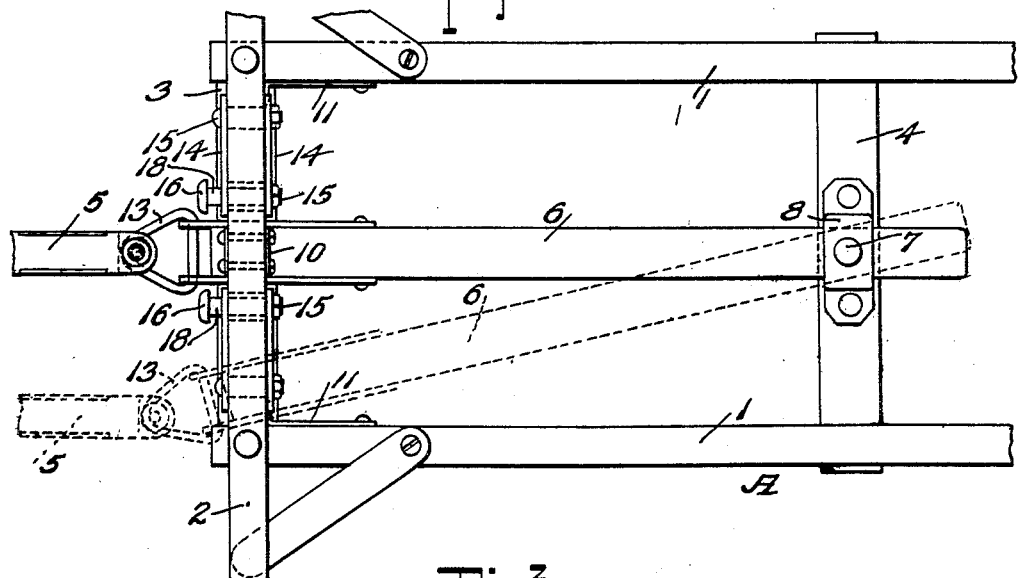
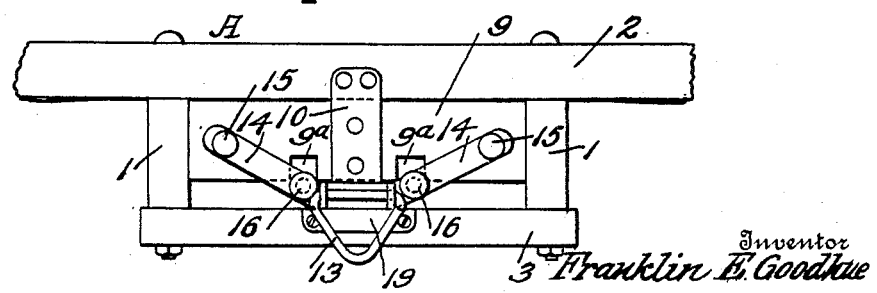
Witnesses
E. H. Wagner
G. W. Kirkley
Inventor
Franklin E. Goodhue
By Robb & Robb
Attorneys

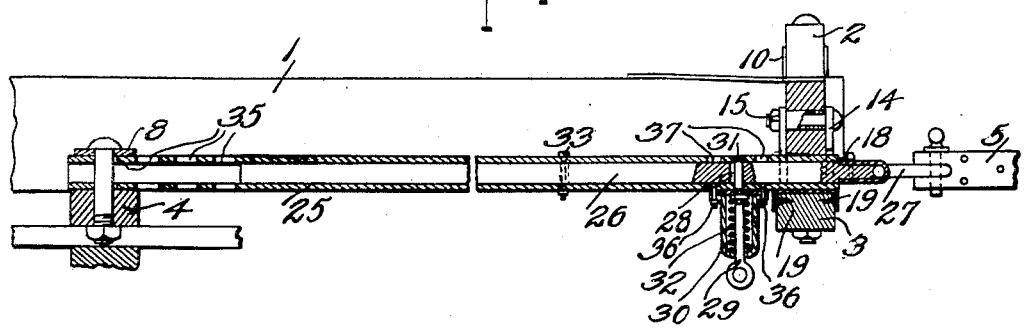
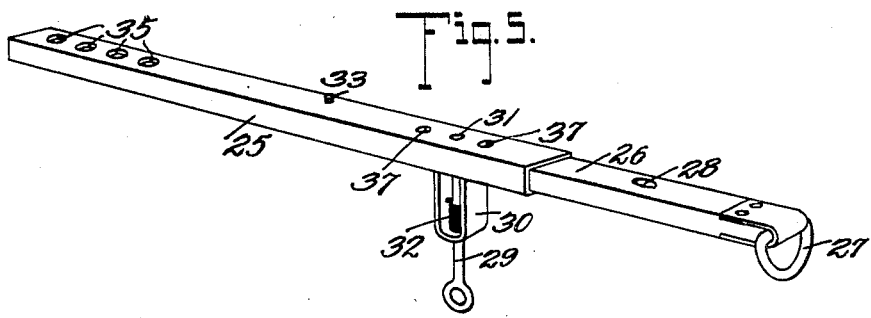
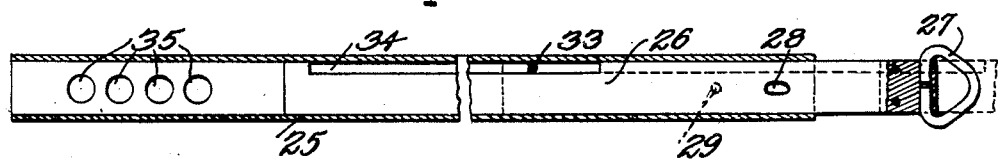
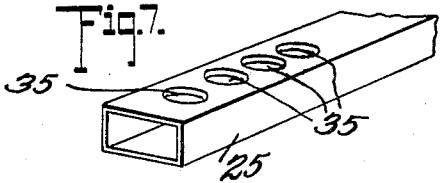

UNITED STATES PATENT OFFICE.

FRANKLIN E. GOODHUE, OF NEWTON, IOWA.

DRAW-BAR ATTACHMENT.

1,068,334.　　　　　Specification of Letters Patent.　　Patented July 22, 1913.

Application filed March 17, 1913.　Serial No. 754,873.

*To all whom it may concern:*

Be it known that I, FRANKLIN E. GOODHUE, a citizen of the United States, residing at Newton, in the county of Jasper and State of Iowa, have invented certain new and useful Improvements in Draw-Bar Attachments, of which the following is a specification.

As is well known, it is customary in harvesting, to couple a hay loader with a hay rack so that the two may be drawn over a field simultaneously, the loader loading the hay into the rack. Considerable difficulty has heretofore been experienced in coupling the rack and loader for the purpose mentioned because the rack is usually provided at its rear end with a coupling member which it is necessary to aline with the coupling bar of the loader in order to connect the two parts. Often the hay rack wagon has to be drawn forward and back several times in order to bring the loader coupling bar and the rack coupling member into proper positions admitting of the desired connection.

The present invention has for its primary object to facilitate the coupling of two agricultural implements such as just mentioned by providing for the rack a movable coupling bar capable of considerable lateral adjustment so as to be very easily positioned for its connection with the coupling bar of the loader, certain automatic devices coöperating with the rack coupling bar to lock the same in a centralized rigid position as soon as the rack is drawn forward.

The invention resides in the special means carried by the rack, or an equivalent structure for accomplishing the coupling action in the general manner above described, and an additional feature of the invention is comprised in that construction of the coupling parts carried by the hay rack admitting of the employment of these parts as an attachment applicable to any of a certain type of racks which are very much used at the present time.

For a full understanding of the present invention, reference is to be had to the following description and to the accompanying drawings, in which—

Figure 1 is a side view partly broken away and shown in section, illustrating the rear end portion of a hay rack of conventional construction with the invention applied thereto, and the coupling bar of a loader connected with the coupling means of said rack. Fig. 2 is a plan view of the same, dotted lines illustrating the wide range of movement in one direction of the rack coupling or draw bar. Fig. 3 is a rear elevation of the rack and associated parts of the attachment. Fig. 4 is a vertical sectional view of a modified embodiment of the invention. Fig. 5 is a perspective view of the modified construction of draw bar, the extensible member in extended position. Fig. 6 is a horizontal sectional view taken through the modified form of draw bar, the parts in their normal positions. Fig. 7 is a fragmentary perspective view of the inner end of the inner member of the draw bar.

Throughout the following detail description and on the several figures of the drawings, similar parts are referred to by like reference characters.

As previously intimated, the hay rack A to which the invention is applied, is of an ordinary type commonly used at the present time and adapted as customary to be supported upon the bolsters of a wagon. The rack A comprises the spaced longitudinal sills 1 which are usually connected by upper cross bars, the rearmost of which is shown at 2 and by lower cross pieces, the rearmost and intermediate ones of which are shown at 3 and 4, respectively. The running gear of the wagon supporting the rack A, as well as the loader, which is coupled to the rack by means of the invention, are not shown, the coupling bar or tongue of the loader being designated 5, however.

The coupling means comprising the attachment of the present invention includes the draft bar 6, the front end of which is pivotally connected at 7 with the cross piece 4 of the rack, said end passing through a keeper 8 mounted on the cross piece 4. At its rear end, the draw bar 6 is freely movable upon the cross piece 3 in a space between said cross piece and a detachable supporting member 9. The supporting member 9 is situated between the sills 1 at the rear end of the rack and beneath the cross bar 2, a U-shaped attaching member 10, preferably of metal, receiving between its sides the supporting member 9 and being attached thereto and to the bar 2, as shown clearly in Figs. 1 and 3 of the drawings. The supporting member 9 is also rigidly held from displacement by means of angle plates 11 secured to the parts 1 and 9 at the inner angles formed by the abutting relation of the ends of the member 9 with respect to the sills 1.

Plates 12 are attached to opposite sides of the draw bar at the rear end of the latter and these plates project in spaced relation from the adjacent extremity of the bar 6 and carry a pivoted coupling or draft link 13. The supporting member 9 carries a pair of spaced dogs 14, each of which dogs comprises spaced plates located at opposite sides of the member 9 and pivotally connected to the latter at 15. The free ends of the plates composing each dog 14 are connected by a bolt or similar member 16, said plates being held spaced by a bushing 17 on the bolt 16, said bushing being arranged between the plates of the dog. A second bushing 18 is interposed between the head of each bolt 16 and the rearmost plate of the dog 14 and maintains the head portion of the bolt projected so as to form a handle that will facilitate ready manipulation or lifting of the dog when desired. The lifting of the dogs 14 is permitted by reason of the formation of notches 9ª in the supporting member 9, said notches forming clearance spaces which the bolts 16 are adapted to enter when the dogs 14 are upraised.

The foregoing briefly describes the construction of the several parts of the invention with the exception of the provision of a plate 19 of somewhat U-shape in cross section, which plate embraces the cross piece 3 at opposite sides and is secured to said cross piece at its central portion. The plate 19 constitutes a guard on the cross piece 3 to protect the latter against the wear incidental to the contact of the rear end of the draw bar 6 therewith. The lower end of the U-shaped plate 10 performs a similar function to the plate 19 in addition to the coöperation between the parts 9 and 10.

If, in coupling the hay rack wagon to which the invention is applied, with the hay loader, the wagon is backed so that the link or coupling member 13 is practically in front of the coupling bar 5 of the loader, there will be no difficulty in effecting a coupling operation. Should, however, the two vehicles which are to be connected be so situated during the coupling operation that the coupling bar 5 is at one side of the rear end of the draw bar 6, it is only necessary for the operator to raise the dog nearer to the bar 5 and move the rear end of the draw bar 6 in front of the bar 5, whereupon the coupling operation may be effected without any re-arrangement of the vehicles themselves. Of course, the bar 6 may be moved in either direction at its rear end by the lifting of one of the dogs 14 and when moved in a predetermined direction, the dog will rest on top of the bar 6 and remain there until the hay rack is pulled forward in a manner to centralize the bar 6, whereupon the raised dog 14 will gravitate to its normal position, as shown in Fig. 3 and automatically lock the draw bar 6 from further lateral play or movement. The plate 19 constitutes a protecting element for the cross piece 3 in so far as wear incidental to the dropping of the dogs 14 on said bar 3 is concerned, the free ends of the dogs being somewhat tapered or pointed.

The invention is very simple and really consists of two main parts, namely, the supporting member 9 with its attached plates and dogs, and the draw bar 6 and its corresponding parts. By merely cutting the ends of the supporting member 9, the latter may be made of a suitable length to apply to almost any hay rack of the basket type, and in like manner the hole for the pivot 7 of the draw bar 6 may be bored at a suitable point to permit the application of the attachment to racks of different lengths.

It is contemplated, according to a modified construction of the invention illustrated in Figs. 4 to 7, inclusive, that the draw bar 25 shall be provided with an extensible section or member 26. For this purpose, the draw bar 25 is preferably of hollow metal construction and the member 26 is received in the hollow portion of the draw bar 25 and is freely slidable when not locked by the means now to be described.

The member 26 has the draft link 27 secured thereto at its outer end and formed in the member 26 is a slightly elongated opening 28. The opening 28 is adapted to receive a locking pin 29 which is slidable in a yoke 30 attached to the under side of the draw bar intermediate its ends. The lower end of the pin 29 has a loop or hand-piece to facilitate manipulation of the pin and the upper end of the pin is rounded so as to readily enter the opening 28 of the member 26 and corresponding openings 31 in the upper and lower sides of the draw bar 25, whereby to lock the parts 25 and 26 in their normal positions shown in Fig. 4. A spring 32 encircles the pin 29 and bears at one end against the outer portion of the yoke 30 and at the other end against a cross pin carried by the part 29, said spring normally tending to force the pin 29 into engagement with the parts 25 and 26. The sliding or longitudinal telescopic movement of the member 26 is limited by means of a stop 33 which passes vertically through the draw bar 25 at approximately a middle point therein, said stop coöperating with an elongated recess 34 in a side of the member 26.

The draw bar 25 will be preferably formed with a plurality of openings 35 at the rear end of said bar and in one of which openings, and the cross piece 4 of the rack A, the pin 7 is adapted to pass in order to afford an adjustable connection between the draw bar and the rack. In so far as the coöperation of the draw bar just described, and the dogs 14, are concerned, the description in relation to the form of the invention illustrated by Figs. 1 to 3, fully applies. By the provision, however, of the sectional draw bar construction last set forth, it will be apparent that the longitudinal adjustment of the member 26 is advantageous in facilitating the connection of the draft link 27 with the draft member of the machine in rear of the rack A, for, should the rack not have been backed quite a sufficient distance to enable the connection between the parts 27 and 5 to be made, the operator only has to draw the pin 29 downwardly to disengage the same from the extensible member 26. The member 26 may then be pulled rearwardly sufficiently to permit the connection of the parts 27 and 5. The operator will then back the rack to cause the member 26 to slide into the bar 25, until the opening 28 is opposite the pin 29, whereupon the latter will be automatically engaged in said opening by the action of the spring 32.

As a detail of manufacture, in order that the bolts 36, which secure the yoke 30 to the bar 25, may have their heads countersunk in the bottom portion of the bar 25, suitable openings 37 are formed in the top of the bar opposite said bolts 36 for the introduction of the countersinking tool.

Having thus described the invention, what is claimed as new is:

1. In a device of the class described, the combination of a laterally movable draw bar, a supporting member, a pair of locking dogs carried by the supporting member above the draw bar and gravitative to engage the latter at its opposite sides to hold it rigid, each dog comprising spaced plates and a member connecting the plates and so projecting from the dog as to form a handle for manipulating the dog.

2. In a device of the class described, the combination of a laterally movable draw bar, a supporting member, a pair of locking dogs carried by the supporting member above the draw bar and gravitative to engage the latter at its opposite sides to hold it rigid, each dog comprising spaced plates and a member connecting the plates and so projecting from the dog as to form a handle for manipulating the dog, the supporting member having a clearance space for the connecting member of each dog into which space the connecting member enters when the dog is raised so as to disengage it from a locking position in respect to the draw bar.

3. In a device of the class described, the combination of a laterally movable draw bar, a supporting member, a pair of locking dogs carried by the supporting member above the draw bar and gravitative to engage the latter at its opposite sides to hold it rigid, each dog comprising spaced plates and a member connecting the plates and so projecting from the dog as to form a handle for manipulating the dog, and a cross piece on which the draw bar is movable and spaced from the supporting member aforesaid to provide a space for lateral play of the adjacent end of the draw bar.

4. In a device of the class described, the combination of a cross piece, a draw bar pivoted at one end and having its other end freely movable on said cross piece, a pair of locking dogs carried above the cross piece and having end portions to engage the cross piece and to engage the draw bar at its opposite sides, and a wear plate on the cross piece to protect the same from wear of the draw bar and wear incidental to engagement with the free ends of the dogs.

5. In a device of the class described, the combination of a hay rack comprising spaced sills, upper and lower cross pieces at the rear ends of said sills, a detachable supporting member secured to the upper cross piece at a point between the sills and spaced from the lower cross piece, a draw bar having one end freely movable in the space between said supporting member and the lower cross piece, and a pair of dogs pivoted at their outer ends to the supporting member and having their inner ends adapted to gravitate into positions in which they rest upon the lower cross piece and engage the draw bar at opposite sides to hold the same rigid.

6. In a device of the class described, the combination of a hay rack comprising spaced sills, upper and lower cross pieces at the rear ends of said sills, a detachable supporting member secured to the upper cross piece at a point between the sills and spaced from the lower cross piece, a draw bar having one end freely movable in the space between said supporting member and the lower cross piece, a pair of dogs pivoted at their outer ends to the supporting member and having their inner ends adapted to gravitate into positions in which they rest upon the lower cross piece and engage the draw bar at opposite sides to hold the same rigid, a U-shaped plate connecting the supporting member with the upper cross piece of the rack and extending between the upper side of the upper bar and the under side of said supporting member so as to form a wear surface, and handles attached to the dogs at their draw bar engaging ends, whereby said dogs may be freely manipulated.

7. In combination, a laterally movable draw bar, a cross piece supporting said draw bar, a pair of pivoted dogs mounted at opposite sides of the draw bar and adapted to gravitate into positions engaging the draw bar and preventing movement thereof, and handles secured to said dogs whereby either may be upraised so as to assume a position in which its draw bar engaging end rests upon the draw bar and permits of movement of the bar in a predetermined direction.

In testimony whereof I affix my signature in presence of two witnesses.

FRANKLIN E. GOODHUE.

Witnesses:
E. F. GOODHUE,
GEORGE GEISE.